United States Patent [19]

Mussallem, Jr.

[11] Patent Number: 4,504,538
[45] Date of Patent: Mar. 12, 1985

[54] RUG UNDERLAY OF FIBERS NEEDLED INTO MESH

[75] Inventor: Charles S. Mussallem, Jr., Jacksonville, Fla.

[73] Assignee: No-Muv Corporation, Inc., Jacksonville, Fla.

[21] Appl. No.: 510,610

[22] Filed: Jul. 5, 1983

[51] Int. Cl.³ .............................................. B32B 5/02
[52] U.S. Cl. .................................... 428/167; 28/107; 264/505; 428/95; 428/172; 428/234; 428/235; 428/239; 428/247; 428/252; 428/284; 428/288; 428/300; 428/301
[58] Field of Search ................ 428/91, 95, 134, 137, 428/167, 172, 234, 235, 239, 247, 252, 284, 288, 300, 301; 264/505; 28/107

[56] References Cited
U.S. PATENT DOCUMENTS
4,140,071  2/1979  Gee ..................................... 428/234

Primary Examiner—Marion E. McCamish
Attorney, Agent, or Firm—Arthur G. Yeager

[57] ABSTRACT

A rug underlay comprising a central open lattice of stiffening material, and intermediate layer of fiber batting on each side of the lattice needle punched through the lattice, an upper outer corrugated layer of heat fused fibers, and a lower outer stiff, backing layer of a mixture of clay and an elastomeric latex impregnating the lower portion of the intermediate layer. This article is used as a padding or an underlay for rugs or carpeting particularly as an underlay for an oriental rug laid over carpeting.

24 Claims, 3 Drawing Figures

RUG UNDERLAY OF FIBERS NEEDLED INTO MESH

BACKGROUND OF THE INVENTION

Area rugs such as Oriental rugs have been in use in homes and offices for many years but the use of padding under these rugs to reduce shock in walking over the rugs is of relatively recent origin. It is now a common practice to lay Oriental rugs over wall-to-wall carpeting or large area carpeting that does not extend from wall to wall. The Oriental rug used in this fashion provides a special aesthetic decoration in a smaller area over the larger area of carpeting. Because many carpeting materials today are made of nylon or other synthetic fibers, it has been found that the Oriental rug laid over the nylon carpeting may not remain in the desired area after a period of usage because the Oriental rug tends to slip on the nylon carpeting. Accordingly, an underlay is needed to prevent such slippage.

The general structure of the overlay in copending application Ser. No. 451,012 filed Dec. 20, 1982, is admirably suited for the purposes of the present invention except for the layer which would contact the nylon carpeting. That layer has been modified to provide the properties needed for purposes of this invention.

It is an object of this invention to provide a novel rug underlay having nonslip characteristics when placed on top of carpeting. It is another object of this invention to provide a rug underlay of fibrous material having a uniform consistency, no unpleasant odor, and a clean appearance. It is still another object of this invention to provide a rug underlay having upper surface that grips the rug above it and a lower surface that does not slip on carpeting made from synthetic fiber materials. Still other objects will be apparent from a more detailed description of this invention which follows.

BRIEF DESCRIPTION OF THIS INVENTION

This invention provides a rug underlay comprising a central open lattice of stiffening material, an intermediate layer of fiber batting on each side of the lattice, needle punched through the lattice, an upper outer corrugated surface of heat fused fibers and a lower outer stiff layer of a mixture of clay and an elastomeric latex impregnated into the lower portion of the intermediate layer. In preferred embodiments of this invention the fiber batting comprises polypropylene fibers, the open lattice is a stiffening structure of polypropylene filaments bonded to each other in a square pattern, and the mixture of clay and latex comprises about 100 parts by weight latex and 50-100 parts by weight clay.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
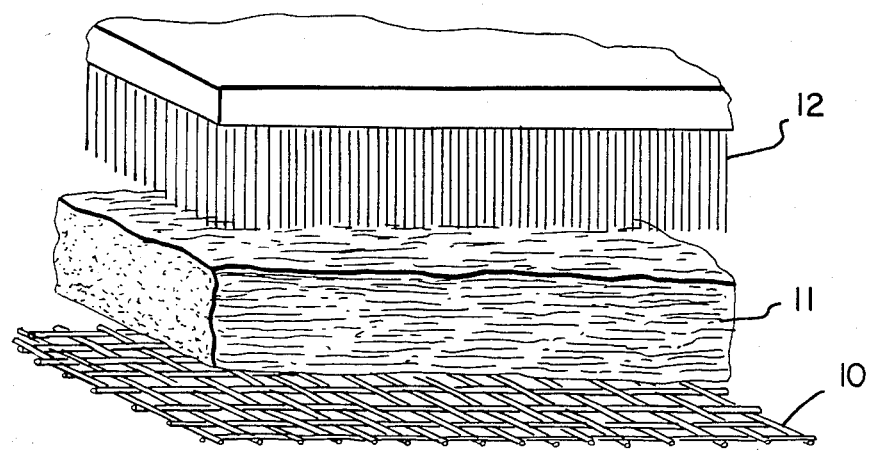
FIG. 1 is a schematic illustration in perspective indicating how layers of the underlay are needle punched into an open lattice stiffener.
Figure 2:
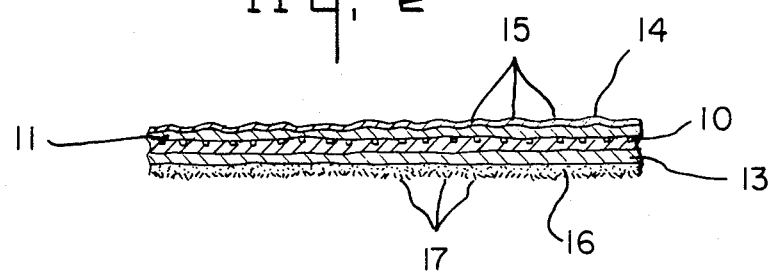
FIG. 2 is a cross section through the rug underlay of this invention.

The central core of the rug underlay of this invention comprises at least two layers of fibrous material compressed into and attached by bonding or otherwise to the two outer surfaces of a central layer of stiffening material. This central core can be made in any of several ways but it has been found most desirable to perform it by a needle punching operation which is depicted in FIG. 1. An open lattice 10 of flexible stiffening material is overlaid with a layer of fiber batting 11 and subjected to a needle punching operation in a press in which a plurality of closely spaced, barbed needles 12 are punched through batting 11 and stiffening layer 10 several times until batting 11 is compressed to a very thin dense layer of intertwined fibers with stiffening layer 10 embedded therein. Stiffening layer 10 is preferably a coarse mesh of synthetic filamentary material, such as polypropylene, of about 5-40 mils in diameter. Needle punching is a common operation employed in the fiber industry to intertwine fibers and filaments into a felt-like layer of material. The product produced by the operation just described in FIG. 1 is then turned over and another layer of batting 13 is applied to the opposite surface and needle punched again. These operations are repeated with new layers of batting applied to opposite sides of the layer of embedded stiffening material until a central core has been produced to the desired thickness. The fibers in the batting may be any type of natural or synthetic fibers, although synthetic are preferred such as polypolefin, nylon, polyester, acrylic polymer, etc. Preferably the fibers are polypropylene or mixtures of polypropylene and acrylic polymer. Preferably the central core will have at least one layer of fiber batting having the layer of stiffening material 10 embedded in it and two intermediate layers of batting, one on each side of the central embedded layer. This central core comprises layers 10,11, and 13 as shown in FIG. 2.

The central core as described above is then treated to produce an upper layer 14 which will cling to the rug that is positioned on the top of the underlay and a lower layer 16 which will provide a nonslip contact with the carpeting upon which the rug and underlay are positioned. Upper layer 14 is a surface of fused fibers having a stiff hard feeling as compared to the compressed fibers of the central core. Upper layer 14 also has some fiber ends projecting upwardly which can be sensed by rubbing this surface with one's fingers or by looking at the surface through a microscope. These fiber ends produce a good nonyielding contact with the rug when positioned on that surface. A preferred method of producing surface 14 is by applying sufficient heat to partially fuse the fibers at the outer surface of intermediate layer 11 of needle punched fibers described previously. The corrugated appearance 15 of upper layer 14 may be achieved by passing the underlay under a corrugated heated roller which is heated to a sufficiently high surface temperature to cause partial fusing of the fibers in the upper portion of layer 11 as they pass under the roller. This action produces a semistiff corrugated surface 14 that provides an excellent grip for a rug lying on top of the underlay.

It is not critical that corrugations 15 be in any particular design to provide the proper contact between the underlay and the rug resting on the underlay. The design may be parallel ridges and grooves, a geometric design such as squares, triangles, etc; or any other design of ridges and valleys which will provide a good grip on the underneath side of a rug and, at the same time provide a good cushioning, effect. A particularly preferred design is parallel ridges about ⅛-¼ inch apart, and with very shallow valleys between the ridges, approximately 1/16 inch elevation difference between the tops of the ridges and the bottoms of the valleys.

Lower layer 16 is a stiff, semi-flexible elastomeric material which is bonded to the lower surface of the central core of needle punched fibers so as to provide a nonslip contact with a carpet on which it lays. This layer may be made with a geometric design on its outside surface, but preferably takes on the random fibrous pattern 17 of the intermediate layer of the underlay. A highly desirable material for layer 16 is a mixture of clay and a latex of an elastomeric material, preferably about 50–100 parts by weight of clay for every 100 parts by weight of synthetic latex. The synthetic latex may be any of a variety of elastomeric lattices although the preferred type is carboxylated styrene/butadiene copolymer having at least about 65% of bound styrene in the copolymer. Any type of clay is suitable in this mixture. Clay is generically defined as a hydrated aluminum silicate. The clay/latex mixture is an aqueous mixture of any suitable amount of water for handling purposes. Layer 16 is formed by spreading the mixture of clay and latex onto the intermediate layer so as to impregnate the surface of the intermediate layer with the aqueous mixture and allowing the mixture to dry, preferably with the assistance of heat. This produces a relatively stiff coating with stiffened fibrous components 17 projecting from the surface.

These stiffened fibrous components produce a nonslip contact with carpeting of nylon or any other carpeting material. One method of forming layer 16 is to pour an aqueous clay/latex mixture over the lower surface of the fibrous structure and to subject it to the action of a heated roller which presses the rubbery material into the fibrous layers and dries the mixture in place. This structure is then placed in heated ovens to cure and finish the latex in the layer. Regardless of how the attachment is made it should be impregnated into and be well bonded to the fiber structure so as to provide a good nonslip contact between the underlay and the carpet underneath.

Figure 3:
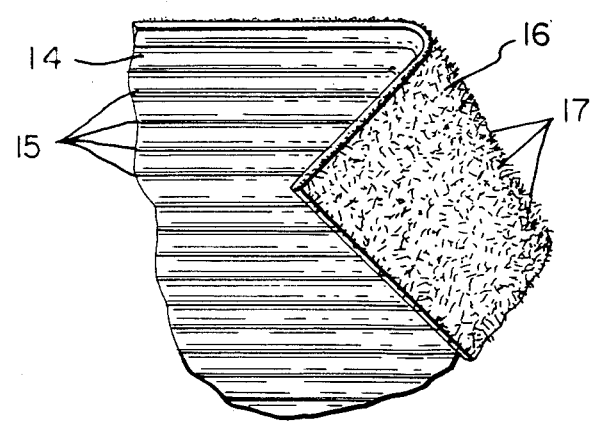
FIG. 3 is a plan view of the top layer of the rug underlay with a portion thereof folded so as to show the lower outside layer of the underlay.

FIG. 3 shows the general appearance of the underlay with parallel corrugated formations on upper layer 14 and with the random fibrous structure 17 on lower layer 16. An appropriately prepared underlay of the construction described above may have a thickness of about ¼ inch for a weight of approximately 28 ounces or a thicker structure of about ½ inch for a weight of about 48–52 ounces. Thicknesses and weights between these extremes are also readily prepared as may be understood by those skilled in the art.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. A rug underlay comprising a central open lattice of stiffening material, an intermediate layer of fiber batting on each side of the lattice, needle punched through the lattice, an upper outer corrugated layer of partially heat fused fibers produced by heat fusing and corrugating the upper surface of one of said intermediate layers, and a lower outer layer of stiff, semi-flexible mixture of clay and a latex of an elastomeric material.

2. A rug underlay of claim 1 wherein said stiffening material is polypropylene.

3. A rug underlay of claim 1 wherein said fiber batting and said fibers are polypropylene.

4. A rug underlay of claim 1 wherein said fiber batting and said fibers are a mixture of polypropylene and acrylic polymer fibers.

5. A rug underlay of claim 1 where said stiffening lattice is incorporated into a central layer of needle punched batting, and an intermediate layer is needle punched into each side of the central layer.

6. A rug underlay of claim 1 wherein said upper outer layer is produced by applying a heated, corrugation-producing surface to one of said intermediate layers to cause melting of the fibers on the heated surface of that intermediate layer.

7. A rug underlay of claim 1 wherein said lower outer layer is a stiff, semi-flexible material impregnated into said intermediate layer and having a pattern of random fibrous projections.

8. A rug underlay of claim 7 wherein the rubbery material is a mixture of about 50–100 parts by weight of clay and 100 parts by weight of synthetic latex.

9. The rug underlay of claim 8 wherein the synthetic latex comprises a carboxylated copolymer of styrene/butadiene containing at least 65% bound styrene.

10. A rug underlay comprising a central open lattice of stiffening material sandwiched between two compressed needle punched fibrous intermediate layers, an upper outside layer of partially fused fibers in a corrugated pattern attached to the outside surface of one of said intermediate layers and produced by fusing and corrugating the upper surface of one of said intermediate layers, and a lower outer layer of a stiff, semi-flexible mixture of clay and a synthetic latex impregnated into said intermediate layer adjacent said lower outer layer.

11. A rug underlay of claim 10 wherein said fibrous layers comprise polypropylene fibers.

12. A rug undelay of claim 11 wherein said fibrous layers consist essentially of a mixture of polypropylene fibers and acrylic polymer fibers.

13. A rug underlay of claim 10 wherein said central layer includes an open square lattice of synthetic plastic filament.

14. A rug underlay of claim 13 wherein the synthetic plastic is polypropylene.

15. A rug underlay of claim 10 wherein said fibrous layers are prepared by needle punching a batting of fibers into a contiguous fibrous layer to produce a thin compressed fibrous layer.

16. A rug underlay comprising a central layer of polypropylene fiber needle punched and compressed into an open lattice, square pattern of polypropylene filament, an intermediate layer of polypropylene fiber on each side of the central layer, needle punched and compressed into the central layer, the outside surface of one of said intermediate layers being a corrugated pattern of partially fused fibers, and an outer layer of clay/synthetic latex impregnated in the outside surface of the other of said intermediate layers, the outside surface of said outer layer having a pattern of stiff fibrous components projecting therefrom in a random design.

17. A rug underlay of claim 16 wherein each of said needle punched layers of fiber is a mixture of polypropylene fiber and acrylic polymer fiber.

18. A method of preparing a rug underlay which comprises subjecting a stiffening lattice and a first layer of fiber batting to the action of a needle punch press until the fiber batting is intertwined with the lattice and the resulting structure is compressed into a first thin layer, subjecting the opposite surface of the thin layer and a second layer of fiber batting to the action of a needle punch press until the fiber batting is intertwined with the first thin layer and the resulting structure is compressed into a second thin layer slightly thicker than the first thin layer, repeating the previous step sufficient times to successively alternate sides of the resulting layer to produce the desired thickness of a compressed fiber structure, subjecting the upper surface of the compressed fiber structure to heat and pressure to produce a corrugated surface of partially heat fused fibers, and impregnating the lower surface of the compressed fiber structure to an aqueous mixture of clay and synthetic latex which is dried and heat cured in place.

19. The method of claim 18 wherein the compressed fiber structure is about ¼ to ½ inch thick.

20. The method of claim 18 wherein said stiffening lattice is a sheet of open lattice spaced polypropylene filaments forming mesh of small rectangular open spaces between filaments bonded to each other at points of intersection.

21. The method of claim 18 wherein the fibers of the batting are polypropylene fibers.

22. The method of claim 18 wherein the fibers of the batting are mixtures of polypropylene fibers and acrylic polymer fibers.

23. The method of claim 18 wherein the mixture of clay and rubbery material is synthetic latex and is about 50-100 parts by weight of clay and 100 parts by weight of synthetic latex.

24. The method of claim 23 in which the synthetic latex comprises a carboxylated copolymer of styrene/butadiene containing at least 65% bound styrene.

* * * * *